April 1, 1958
T. E. BRYAN
2,828,698
GAS LIFT VALVE ASSEMBLY
Original Filed June 8, 1954
6 Sheets-Sheet 1
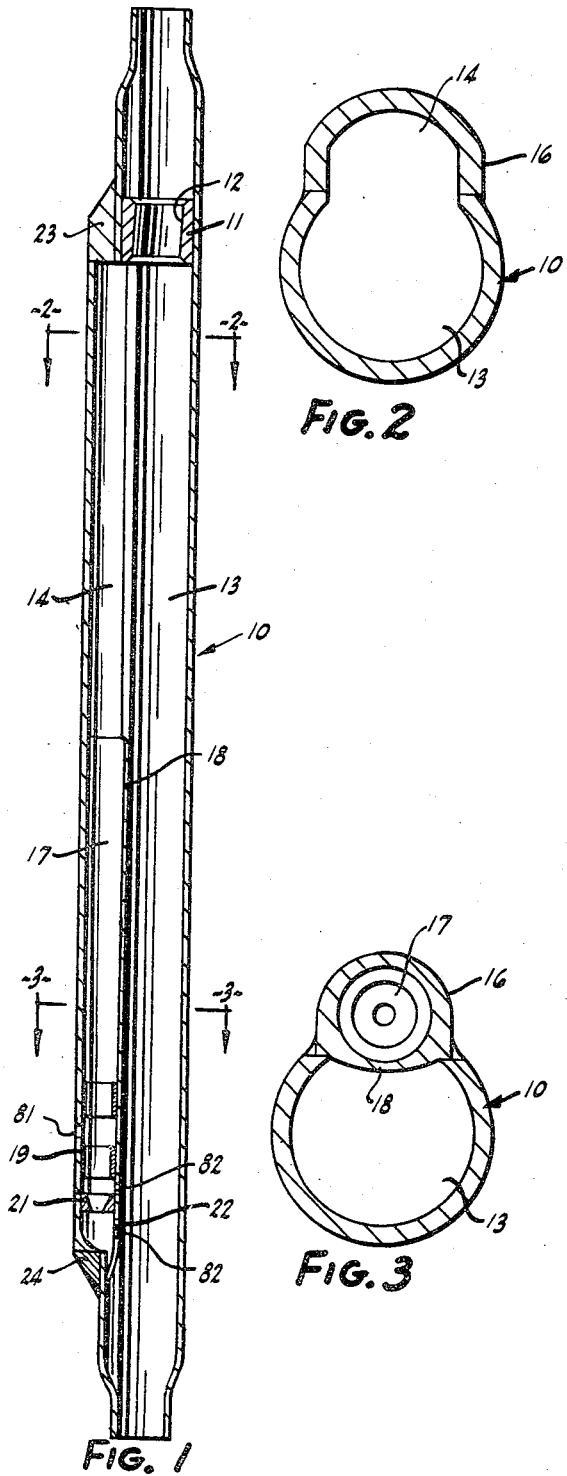
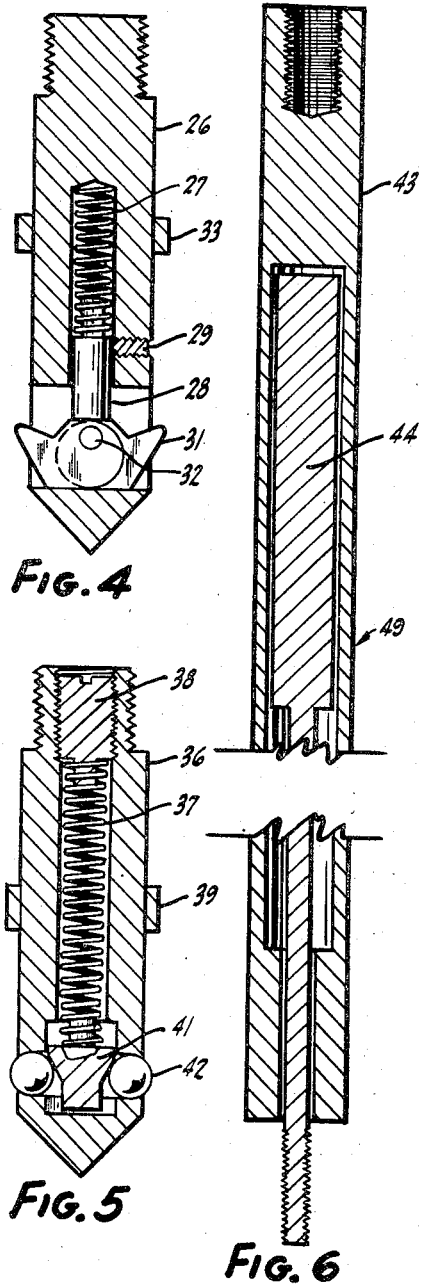
INVENTOR.
THOMAS E. BRYAN
BY
Mellin and Hanscom
ATTORNEYS April 1, 1958

T. E. BRYAN 2,828,698

GAS LIFT VALVE ASSEMBLY

Original Filed June 8, 1954

INVENTOR.
THOMAS E. BRYAN
BY
Mellin and Hanscom
ATTORNEYS

April 1, 1958
T. E. BRYAN
2,828,698
GAS LIFT VALVE ASSEMBLY
Original Filed June 8, 1954
6 Sheets-Sheet 3
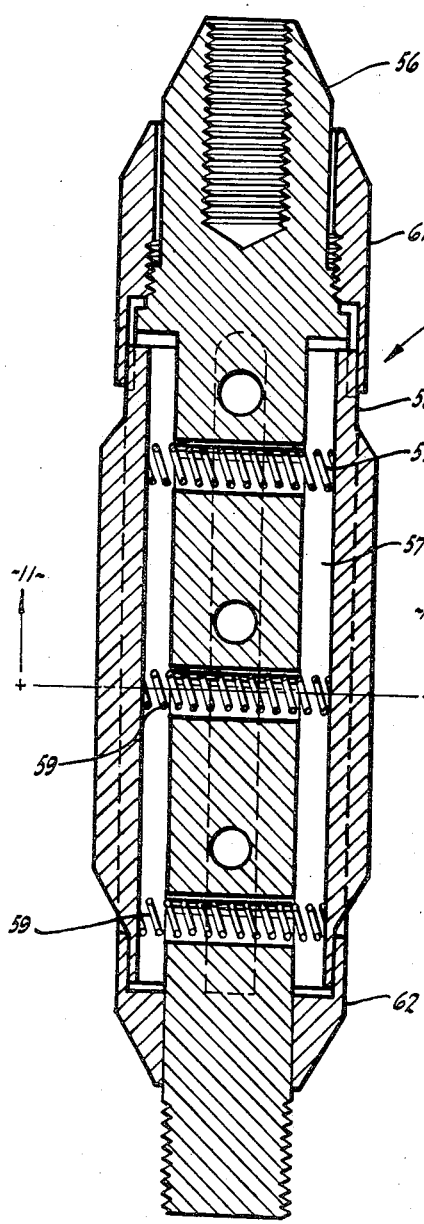
FIG. 10
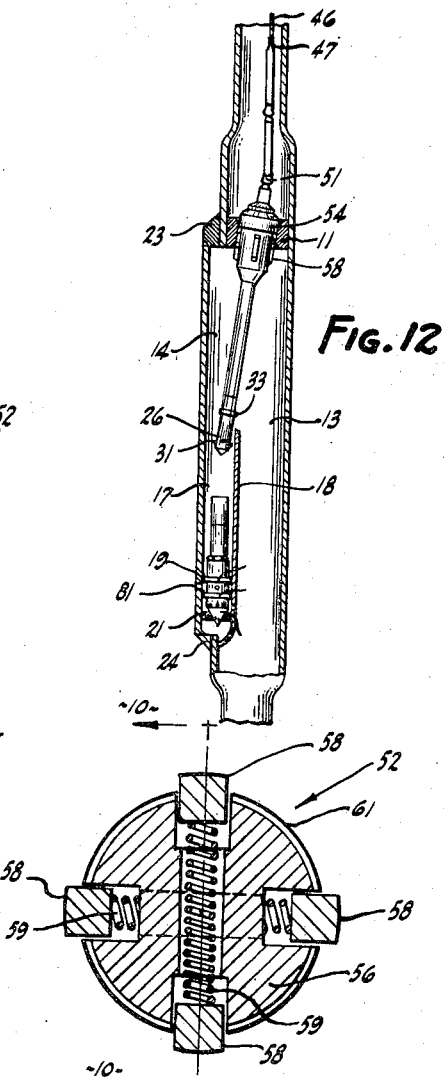
FIG. 12
FIG. 11
INVENTOR.
THOMAS E. BRYAN
BY
Mellin and Hanscom
ATTORNEYS April 1, 1958  T. E. BRYAN  2,828,698
GAS LIFT VALVE ASSEMBLY
Original Filed June 8, 1954

INVENTOR.
THOMAS E. BRYAN
BY
*Mellin and Hanson*
ATTORNEYS

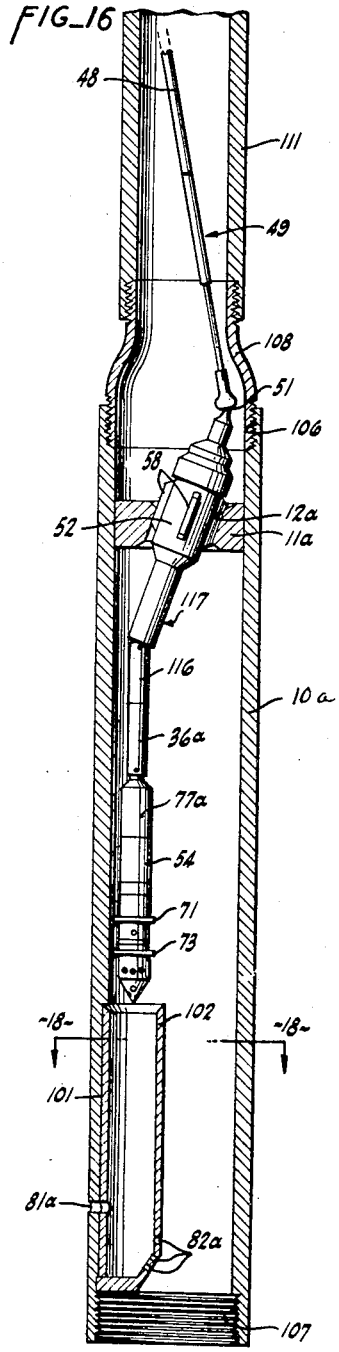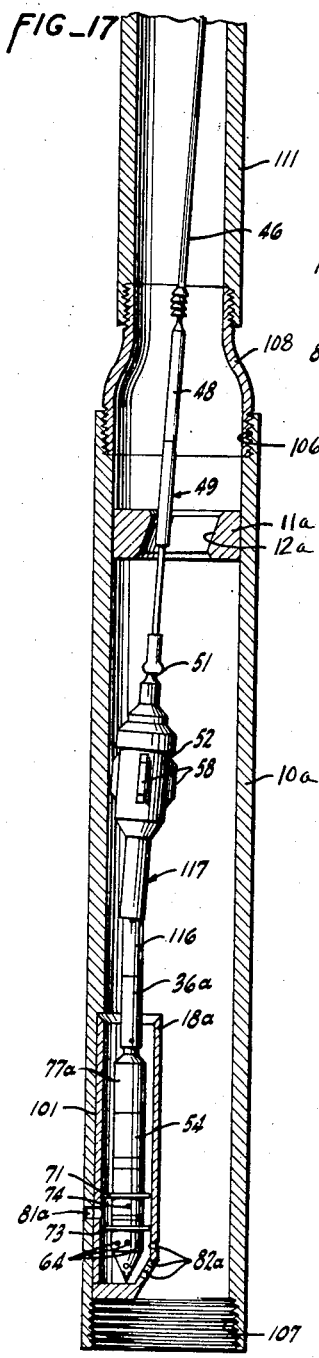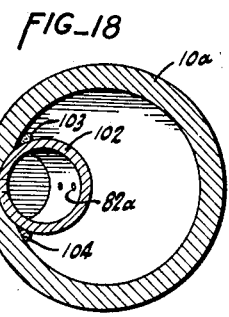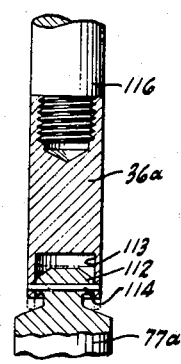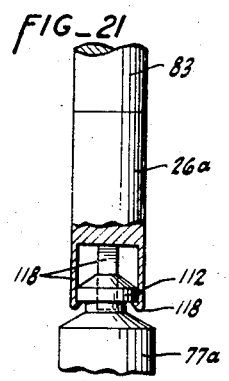

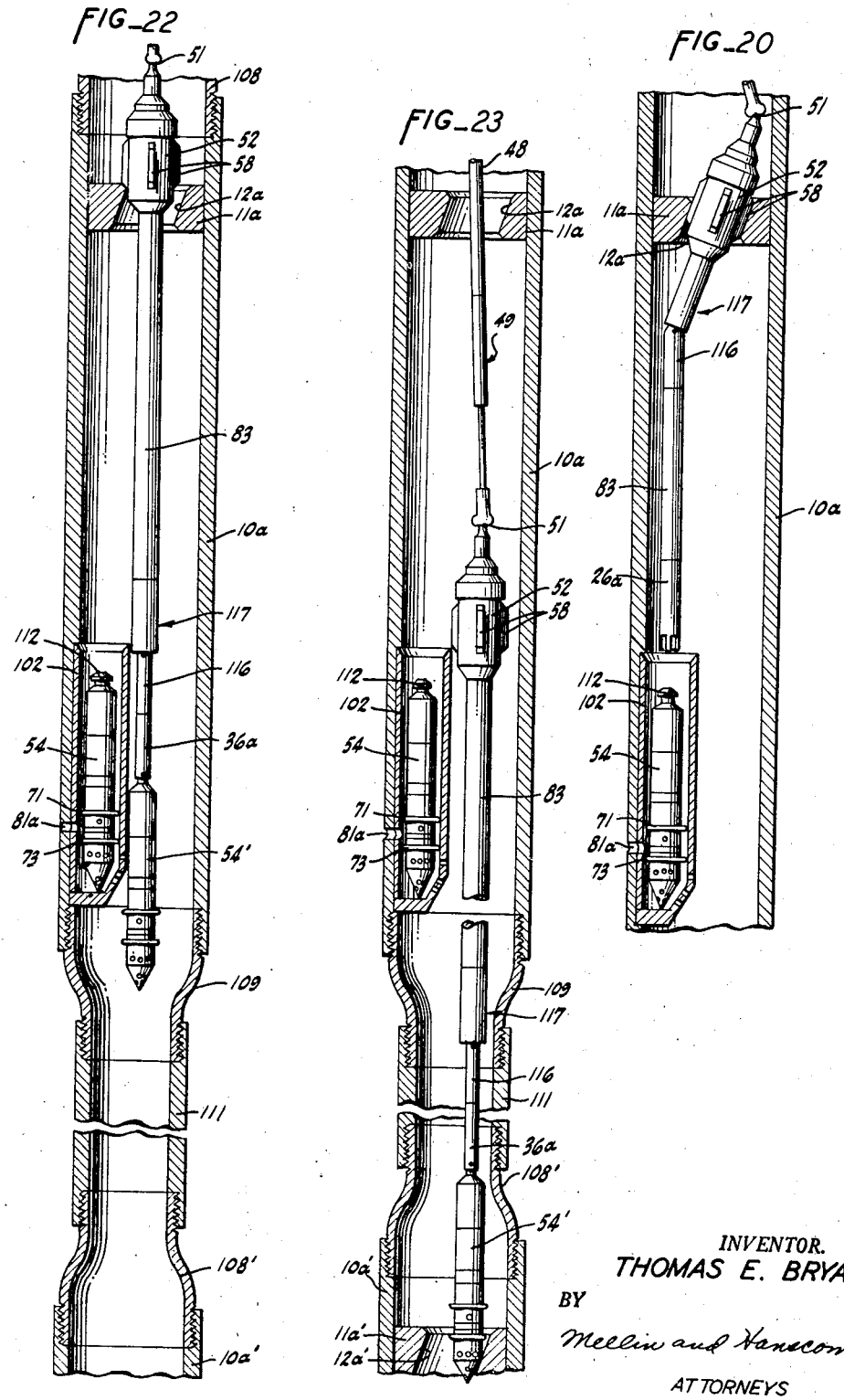

United States Patent Office 2,828,698
Patented Apr. 1, 1958

2,828,698

GAS LIFT VALVE ASSEMBLY

Thomas E. Bryan, Fort Worth, Tex., assignor to Otis Engineering Corporation, Dallas, Tex., a corporation of Texas Continuation of applications Serial No. 435,117, June 8, 1954, and Serial No. 540,739, October 17, 1955. This application April 9, 1957, Serial No. 651,746

29 Claims. (Cl. 103—232)

This invention relates to improvements in oil wells and the like, particularly with regard to improvements in gas lift systems and methods of installing and servicing the elements of such a system in a well casing, and is a continuation of my co-pending application Serial No. 435,117, filed June 8, 1954, now abandoned and of my co-pending application Serial No. 540,739, filed, October 17, 1955 now abandoned.

In the art of extracting oil from the earth, it is well known to employ gas lift systems when the flow rate of the well is less than desired, or when the oil will not flow from the well under its own pressure.

Such gas lift systems take various forms, but essentially all of them comprise means for injecting gas under pressure at one or more points along the casing into the tubing, or well string, through which the oil flows, whereupon the energy released by the gas in expanding will drive the oil upwardly in the tubing, whence it eventually flows to an external pipe line.

The injection of gas is accomplished by valve means located in or along the tubing, and these valve means may be operated to their open position either by the pressure of the gas that is to be injected, by the pressure of the oil within the tubing, or by predetermined pressure differential between the said gas and oil. A particular manner of operating the valves is subject to individual preference under particular conditions.

This invention provides, and has for its main object, special tubing sections that may be permanently set into a well string and into which gas lift valves may afterwards be selectively installed or removed.

A further object of the invention is to provide a special tubing section having an offset valve receiving pocket for receiving flow valves therein, and a guide ring in the tubing section disposed to guide valve running or withdrawing tools into the pocket.

Another object of the invention is to provide a plurality of special tubing sections having offset valve receiving pockets for receiving flow valves therein, each of said tubing sections having guide rings disposed therein to guide valve running or withdrawing tools into the valve receiving pocket, and in which each tubing section is dimensioned differently than any of the others so that a given valve tool will enter the valve receiving pocket of only one of the tubing sections.

Another object of the invention is to provide a slotted tubular member with another tubular member fixed to the slot so as to form a valve receiving pocket offset from the axis of the slotted tubular member, and to provide a guide ring in the slotted member to guide a valve handling tool into the valve receiving pocket.

According to the arrangement of the present invention, any selected one of the valves can be installed or removed at a desired location without interfering with any of the other valves or like equipment associated with the well tubing. At the same time, the tubing is open for running wire lines therethrough where necessary for cementing, perforating, and like operations wherein devices, such as swabs, balers and pressure measuring instruments, are run in the well tubing as by means of a wire line.

The present invention contemplates the construction of an arrangement which is inexpensive and which can readily be installed, and in which the cooperation of the running and pulling tools with the valves and other apparatus to be moved thereby is positive and completely selective.

It is a further object of this invention to provide a novel arrangement of elements, wherein the valve receiving pockets are received within circular tubular members of larger diameter than that of the regular tubing.

A still further object of the invention is to provide an arrangement of elements as set forth in the previous object wherein said tubular members may be used with overall different sizes of well tubing.

Various other advantages and objectives of the present invention will become more apparent in the following detailed description.

In the accompanying drawings forming a part of this application, and in which like numerals are used to designate like parts throughout the same, Fig. 1 shows an element making up the part of the well tubing comprising an offset valve receiving chamber.

Fig. 2 is a transverse section indicated by line 2—2 of Fig. 1, showing the enlarged upper portion of the tubing element of Fig. 1.

Fig. 3 is a transverse section indicated by line 3—3 of Fig. 1, showing the valve chamber in cross section.

Fig. 4 is a vertical section taken through a typical tool to be used in pulling valves and the like from the well tubing.

Fig. 5 is a sectional view showing a typical running tool to be used in installing the valves and the like in the tubing.

Fig. 6 shows a jar employed in the tool line.

Fig. 10 is a vertical sectional view showing the main tool forming a part of the tool line according to this invention and is indicated by line 10—10 of Fig. 11.

Fig. 11 is a transverse sectional view indicated by line 11—11 of Fig. 10.

Fig. 12 is a sectional view showing the tool line carrying the pulling tool of Fig. 4 as it is brought into position to engage the valve for pulling it from the tubing.

Fig. 16 is a sectional view of a device incorporating the principles of the invention and shows a control valve about to be installed in its pocket.

Fig. 17 is a similar view to that shown in Fig. 16, and shows the valve installed but not yet released from the installing tool.

Fig. 18 is a sectional view taken on line 18—18 of Fig. 16.

Fig. 19 is an enlarged view, partially in section, of the head of the installing tool, and illustrates its connection to the valve.

Fig. 20 is a view similar to that shown in Figs. 16 and 17, and shows the valve retracting tool about to make contact with the valve.

Fig. 21 is an enlarged view, partially in section, of the head of the retracting tool.

Figs. 22 and 23 are views similar to those shown in Figs. 16 and 17, and illustrate the manner in which the installing tool may bypass one valve pocket to install or remove a valve from a pocket lower down in the tubing string.

Figure 7:
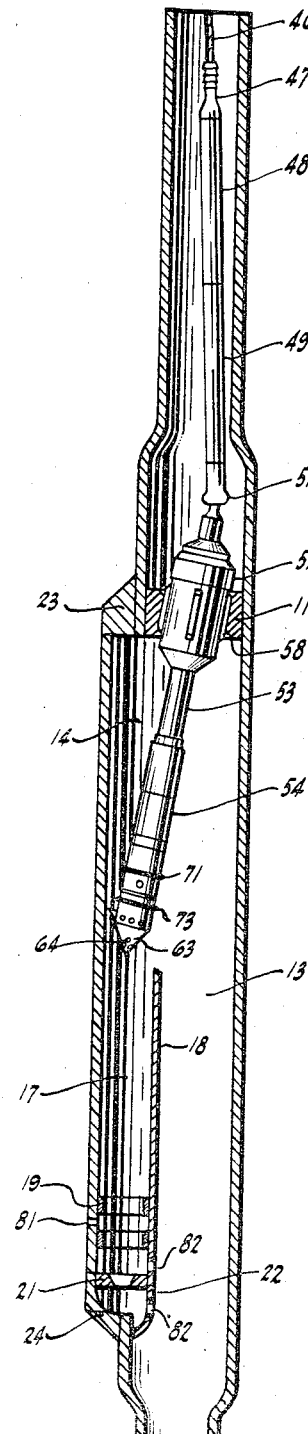
Fig. 7 is a vertical section through a tubing element showing a valve in the process of being installed in the offset chamber thereof.

Referring to the drawings somewhat more in detail, and more particularly to Fig. 1, a tubing element, i. e., section or sub, 10 is provided with a guide ring 11 mounted therein with the vertical axis of the guide ring being concentric with the axis of the tubing element. A bore 12 is formed through the guide ring 11, with the axis of the bore being inclined from the vertical axis of the guide ring.

Beneath guide ring 11, the tubing element 10 comprises a flow passage or chamber 13, which is provided with enlarged vertically offset chamber portion 14. The offset portion may be provided, as indicated in Fig. 2, by slotting the tubular element 10 and welding thereto a length of tubing 16, of the required size, which is also slotted at the upper end thereof to provide for communication between the chambers.

The lower end of the offset tubing 16 forms a valve receiving pocket 17, with an arcuate wall means 18 integral therewith separating the valve receiving pocket 17 from the flow passage 13 of the tubing element.

The bottom of the valve receiving pocket 17 is provided with annular sealing lands 19, which, as will be seen hereinafter, are adapted to sealingly engage resilient sealing rings on the valve which is placed within the chamber. Adjacent the lowermost end of valve receiving pocket 17 is disposed a valve stop 21 which may comprise a tapered bore for receiving a correspondingly tapered end on the bottom of the body of the valve to be installed in the chamber.

Apertures or perforations are formed through the lower end 22 of wall 18 to allow fluid communication between the valve receiving pocket 17 and the flow passage 13 of the tubing element. End plugs 23 and 24 are welded in place to close the opposite ends of the offset tubing 16 and also to protect the chamber 14 from being damaged when the tubing is being run.

The pulling tool shown in Fig. 4 comprises a member 26 having a bore in which is located a compression spring 27 that bears on a plunger 28, the travel of which may be limited by a setscrew 29, if desired.

The plunger 28 bears on the fingers 31 pivoted on a pin 32. The arrangement is such that the fingers 31 will yield upwardly when the tapered lower end of member 26 enters a bore in the upper end of the device to be pulled, and then snap outwardly into a receiving groove thereof effecting a positive connection of the pulling tool with the device being pulled. A stop ring 33 may be mounted on member 26 to stop against the device being pulled, if desired.

A typical running tool is illustrated in Fig. 5 and will be seen to comprise a member 36 having a central bore in which is located a compression spring 37 which is retained in place by the threaded plug 38. Member 36 may include a stop ring 39 usable for the same purpose as stop ring 33 on the pulling tool. Spring 37 bears on the member 41 at its lower end, which has inclined surfaces bearing on the series of balls 42 that extend outwardly through apertures in member 36.

Balls 42 are used for the purpose of engaging the same groove in the device being run by the running tool as the fingers 31 of the pulling tool are adapted for engaging, but it will be evident that, whereas the engagement of fingers 31 is positive, the engagement of balls 42 of the groove is impositive, and the running tool can thus readily be released from the device being run by a quick upward movement of the running tool.

Fig. 6 shows the jar 49 forming a part of the tool line and is a conventional element consisting of a body part 43 and a sliding member 44 therein; the purpose of the jars being to provide means for jarring the lower end of the tool line to move the devices through the well tubing in case they encounter resistance.

Fig. 7 shows a tool line made up with a valve attached to the lower end and being directed into a receiving valve chamber according to this invention. A tool line comprising a wire line 46 having its lower end secured in a wire socket 47 is attached to the upper end of the weight bar 48. Secured to the lower end of the weight, or sinker, bar 48 is a jar 49 and at the lower end of the jar 49 is a knuckle joint 51 to give the lower end of the tool line flexibility. In practice, two or more knuckle joints 51 will be employed, although only one is illustrated in Fig. 7.

Secured to the lower element of knuckle joint 51 is the main centralizing tool 52 of the present invention, which is illustrated as being about half through the guide ring 11. Carried by the lower part of tool 52 is a running tool 53 constructed according to Fig. 5 and carried by running tool 53 is a flow valve 54 which is being installed in the valve chamber.

Turning now to Figs. 10 and 11, it will be seen that the main tool 52 referred to above comprises a main body part 56 having its upper and lower ends adapted for threaded engagement with other parts of the tool line. Body 56 is longitudinally slotted as at 57 to receive guide shoes 58 therein. Compression springs 59 are confined within bores in the body 56 to urge guide shoes 58 outwardly.

The tool also comprises end members 61 and 62 having flanged portions extending over the ends of the shoes 58 to retain them in assembled position on body 56. The upper end member 61 is advantageously threaded to body part 56 for ease in assembling and disassembling tool 52.

The greatest diameter of tool 52 is not greater than the smallest diameter of the tubing, but is preferably slightly smaller. The greatest diameter of main tool 52, with the shoes 58 pressed inwardly thereof, is not substantially greater than the smallest diameter of the guide ring 11 projected on the horizontal plane. The springs 59 are sufficiently strong, however, so that the main tool 52, in passing through guide ring 11, would normally be inclined so that its longitudinal axis is substantially parallel with the axis of the bore in the guide ring as illustrated in Fig. 7. However, when the end of the valve or the like, carried on the lower end of main tool 52, strikes the wall 18 of the valve receiving pocket 17, then the shoes 58 of the main tool will yield inwardly and the tool can be passed through the guide ring at a substantial angle thereto, as particularly indicated in Fig. 15.

Figure 8:
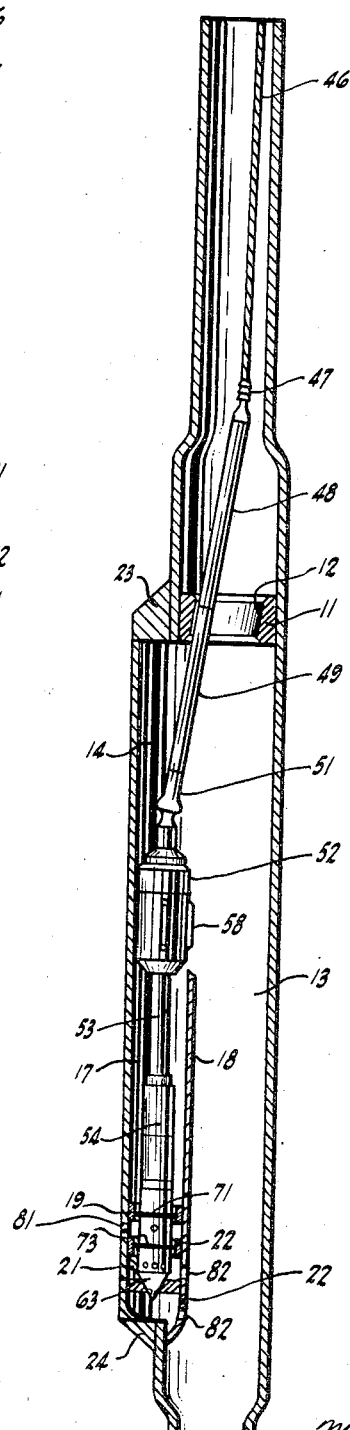
Fig. 8 is a view like Fig. 7, showing the valve completely in position in the offset valve chamber.

Fig. 8 illustrates a valve completely installed in the valve receiving pocket. After the valve has been completely installed, the tool line is pulled upwardly so as to dislodge the running tool from the body of the valve to permit the tool line to be drawn from the casing.

Figure 13:
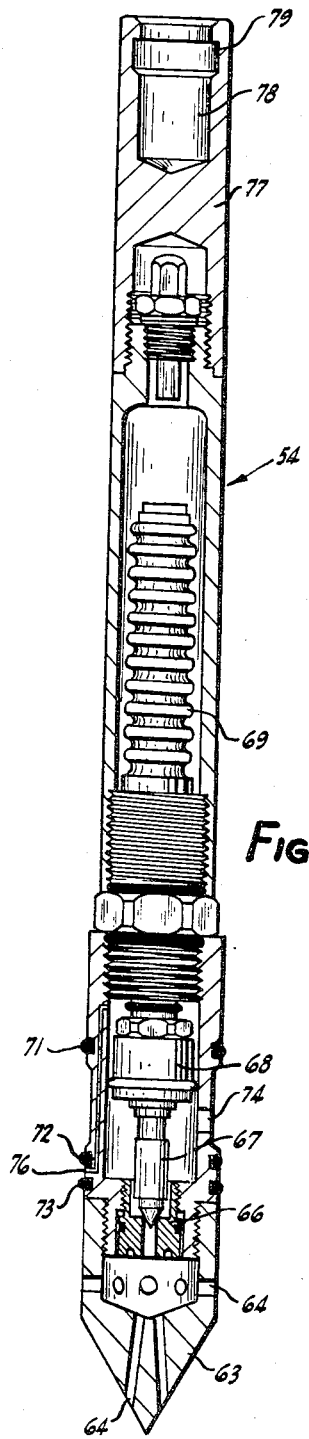
Fig. 13 is a vertical sectional view showing a typical valve adapted for being installed within or removed from a well tubing according to this invention.

The structure of the valve 54 is generally illustrated in Fig. 13, although it will be understood that the particular valve forms no part of the present invention except as to the manner in which it cooperates with the running and pulling devices according to this invention and the method of operation thereof.

In Fig. 13 it will be observed that the valve 54 has a body with a tapered lower end 63 adapted to seat in valve stop 21, with a plurality of ports 64 located in the lower end of the valve body for communication with the spaces above and below the valve stop.

A valve seat means 66 in valve body 54 is engaged by a valve member 67 carried by the piston 68 that is attached to a bellows 69 so as to be urged against the valve seat thereby.

The outer portion of the valve body carries the resilient O rings 71, 72 and 73 adapted to engage the lands 19 in sealing relation. Port means 74 admit gas to the inside of the valve body above seat 66 so that, when valve member 67 lifts, the gas will pass through the valve seat and out through ports 64 and into the tubing.

Where the valve is to operate on pressure differential between gas pressure and oil pressure in the well, a passage 76 is provided leading from between sealing rings 72 and 73 to the space above piston 68.

The upper end of the body of the valve, according to this invention, is provided with a member 77 having a bore 78 with an annular groove 79 therein.

Bore 78 is for the purpose of receiving the lower ends of the pulling and running tools with groove 79 being adapted for being engaged by fingers 31 of the pulling tool for being releasably engaged by the balls 42 of the running tool.

Turning back to Figs. 7 and 8, it will be observed that there is a port 81 in the outer wall of valve receiving pocket 17 located between the two lands 19, and through which port gas under pressure is admitted to the space within the valve chamber and about the valve body between sealing rings 71 and 72 so that this gas enters a valve body through the port 74.

The apertures 82 through the inside wall 18 of the valve receiving pocket 17 above and below valve stop 21 are adapted to allow gas to enter the flow passage of the tubing when the valve member 67 lifts and permits gas to flow through the valve seat 66.

The port, by means of which pressure in the well tubing is transmitted through passage 76 to above piston 68, is not illustrated in the drawings but would consist of an aperture in the inner wall of the valve chamber extending through the lower of lands 19.

The foregoing description concerns the general arrangement of all of the special tubing elements according to this invention, the tool line, and the manner of installing and pulling devices from the offset chamber means of the tubing elements.

Figure 9:
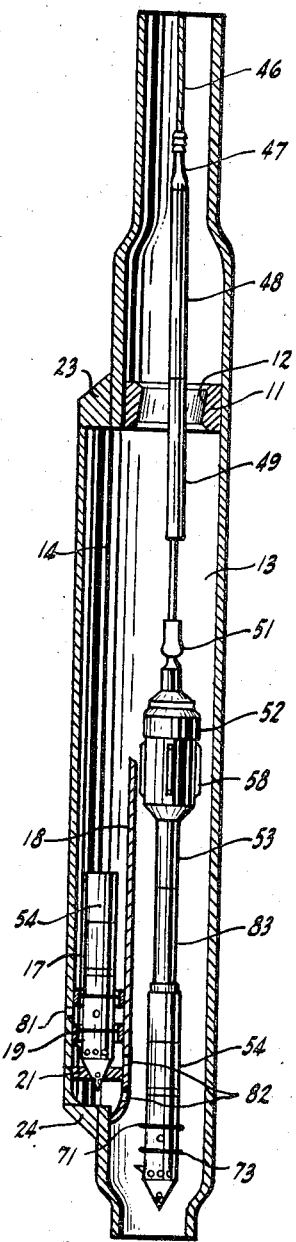
Fig. 9 is a sectional view similar to Fig. 7 but showing a valve bypassing the offset valve in one tubing element to be passed therethrough and to be installed in another tubing element.
Figure 15:
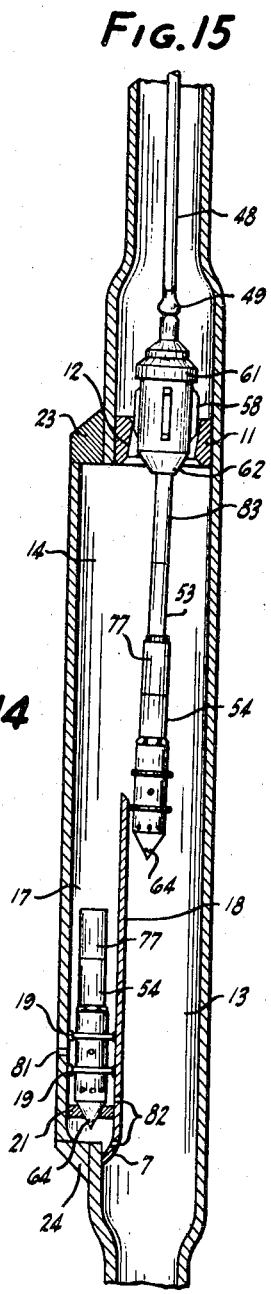
Fig. 15 is a view showing the arrangement of Fig. 9, illustrating how the valve being run strikes the partition at the inner side of the valve chamber in the one tubing element so that it will move completely through the said element and pass on to the element which it is adapted for entering.

It has been mentioned before that the arrangement of the present invention is selective with reference to the tubing elements in which devices are to be installed and pulled, and Figs. 9 and 15 illustrate the manner in which the valve being installed in a lower tubing element can be caused to bypass an upper tubing element.

This is accomplished simply by providing in the tool line an extension 83 of such a length that, instead of the valve and main tool tilting to the degree illustrated in Fig. 7 so that the lower end of the valve passes behind wall 18, the lower end of the valve will engage the outer side of the wall, thus preventing the main tool and valve from tilting more than a predetermined amount so that the main tool 52 will pass through the guide ring 11 at about the angle indicated in Fig. 15, due to the collapsing therein of the shoes 53, and thus permit the tool line to pass completely through that particular tubing element in the manner indicated in Fig. 9.

Figure 14:
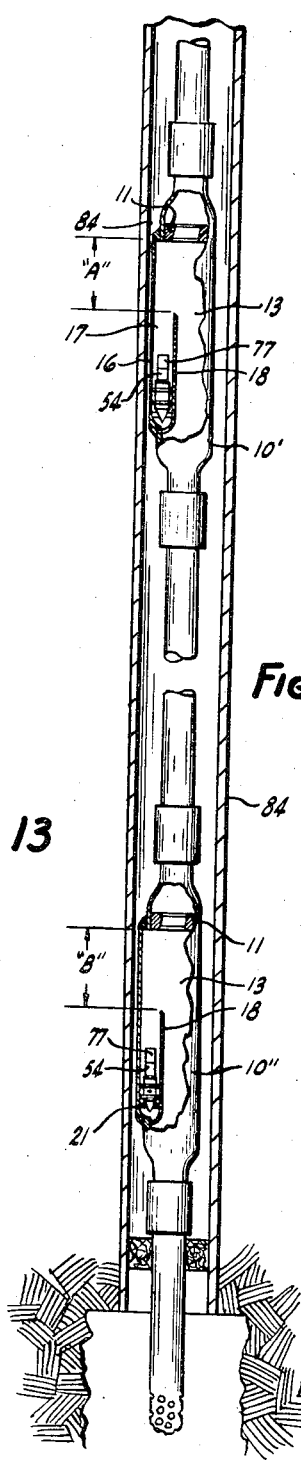
Fig. 14 is a sectional view showing a well tubing constructed according to this invention, with two of the tubing elements therein of the nature illustrated in Fig. 1.

Turning now to Fig. 14, there is shown therein an installation having an outer casing 84 within which is located a tubing consisting of at least two elements 10′ and 10″ constructed according to the present invention with offset chamber means.

The upper of the special elements 10′ is characterized in that the distance from the bottom of the guide ring 11 therein to the top of the wall 18 that separates the valve receiving pocket 17 from the main passage 13 through the tubing, which distance is indicated by the dimension line A, is smaller than the corresponding dimension line B for tubing element 10″. Should more of the special tubing elements be required in the well, the dimension referred to would increase progressively toward the bottom of the tubing.

From the foregoing it will be evident that the present invention provides an arrangement for receiving gas flow valves internally of a tubing in a well for controlling communication between the space around the tubing and the interior thereof, while leaving a substantially unrestricted flow passage through the well tubing for the oil being taken therefrom, with the well tubing being specially formed and there being a special tool line arrangement for selectively running and pulling the valves or other devices, such as blanks, as might be desired to insert in the valve chambers.

In practice, the angle of the bore to the guide ring is between about 3 to 5° from the vertical, but it will be understood that this particular angle could be varied according to individual preference and to particular circumstances.

It will also be understood that the running of the tool line in the well could be carried out through a sealing lubricant at the top thereof to prevent loss of pressure from the well, with the line being operated from a usual type winch.

It will also be understood that the supply of gas under pressure could be from any source, either natural or artificial, and that this gas is introduced inside the well casing externally of the tubing so that the flow thereof into the tubing can be controlled by the flow valves. Further, it is clear that the operation of the flow valve can be controlled by any conventional method, such as by the pressure responsive elements within the valve or by a time cycle controller or the like.

In the form of the invention described above, it is to be noted that the tubular section 10 is irregularly shaped in cross section. It has been found that these irregularities will cause the tubing section to distort under high operating pressures, thus preventing the free entry and removal of the valves from the pocket. Consequently, the following modification has been developed to provide a cylindrical tubular section, capable of withstanding extreme pressure conditions without distortion. Another advantage of the following modification lies in the fact that the tubing section is of larger diameter than the regular tubing in which it is installed, thereby enabling one size diameter of special tubing to be used with many different diameter well tubings, with appropriate reducing elements used to connect the special tubing section into the well string.

Referring now to the modification embodied in Figs. 16–23 of the drawings, and more particularly to Figs. 16–18, the modified device comprises a cylindrical tubular member 10a provided with an arcuate groove 101 milled into its inner surface and extending longitudinally adjacent the lower end thereof. A tubular valve receiving pocket 102 is mounted in the groove 101 and welded to the tubular member 10a in the manner indicated at 103 and 104. A port 81a extends through the tubular member 10a and the wall of the pocket 102 to provide communication between the interior of the pocket and the exterior of the tubular member 10a. A plurality of ports 82a, adjacent the lower end of the valve pocket 102, serve to connect the interior of the pocket with the interior of the tubular member 10a.

Fixed to the interior of the tubular member 10a, adjacent the upper end thereof and at a point spaced from the upper end of the valve pocket 102, is a guide ring 11a having an inclined bore 12a therethrough, the inclined bore being so positioned relative to the tubular member 10a, that its axis will intersect the axis of the valve receiving pocket 102 at a point thereabove.

The tubular member 10a is provided at its upper and lower ends with internal threads, as indicated at 106 and 107, respectively. The tubular member 10a is adapted to be connected by swaged nipples 108 and 109, respectively, to the smaller diameter well tubing 111 above and below the tubular member. It is obvious that the nipples 108 and 109 may be replaced by other nipples having different diameter reductions to permit the tubular member 10a to be used with several different diameter tubing strings.

The valve 54, designed to be installed in and removed from the pocket 102 by tools presently to be described, functions in a manner as has been previously described. When the valve is installed, the O-rings 71 and 73 seal against the wall of the pocket, one above and one below the port 81a, in the manner shown in Fig. 17. The valve housing is provided with a port 74 between the O-ring seals 71 and 73 which provides communication between the interior of the valve housing and the exterior of the tubular member 10a. Similarly, the valve housing is provided with a plurality of ports 64 below the lower O-ring 73 which provide communication between the interior of the valve housing and the interior of the tubular member 10a. The upper end 77a of the valve 54 is provided with a spear point 112, as shown in Figs. 19 to 23, inclusive.

As best seen in Fig. 19, a running-in tool 36a, having a counterbore 113 in its lower end, is connected to the spear point 112 of the valve 54 by a shear pin 114. The upper end of the installing tool 36a is connected to the lower member 116 of a knuckle joint, indicated generally at 117. Referring again now to Figs. 16 and 17, the knuckle joint 117 is connected to a main centralizing tool 52, which, in turn, is connected by a second knuckle joint 51 to the lower end of a jar mechanism, generally indicated at 49. The jar 49 is connected by a sinker bar 48 to a wire line 46.

The exterior diameter of the body of the main tool 52 is sufficiently smaller than the inclined bore 12a in the guide ring 11a, so that the main tool 52 is capable of passing through the guide ring while remaining in a vertical position. However, the main tool is provided with a plurality of spring-pressed longitudinally extending shoe members 58 adapted to engage the walls of the bore 12a and align the axis of the centralizing tool 52 with the axis of said bore in the manner shown in Fig. 16.

In installing a valve, the elements are assembled in the manner described above and lowered by the wire line 46 within the tubing 111. When the main tool 52 aligns itself with the axis of the bore 12a in the guide ring 11a, the lower end 116 of the knuckle joint 117 and the valve 54 will be aligned with the axis of the pocket 102, with the lower end of the valve immediately above the upper end of the valve pocket in the manner shown in Fig. 16. Further lowering will seat the valve 54 in the pocket 102 in the manner shown in Fig. 17. The jar 49 is then actuated to shear the pin 114 and the installing tool is removed, leaving the valve 54 seated in the pocket 102.

When it is desired to retrieve the valve 54, the same tools are employed except that the installing tool 36a is replaced by a retrieving tool 26a in the manner illustrated in Fig. 20. As seen in Fig. 21, the retrieving tool 26a is provided with a plurality of inwardly facing spring hook-shaped fingers 118 adapted to slide over and latch onto the spear point 112 on the upper end of the valve 54.

Figs. 22 and 23 illustrate the manner in which several valves may be selectively installed and removed at various vertically spaced points in the tubing 111. In this illustration, the element 10a and the various elements associated therewith are the same as those described above with respect to Figs. 16 and 17. A second tubular member 10a' is inserted in the tubing 111 at a point below the tubular member 10a. The second tubular member is the esame in all respects as the member 10a, with the exception that there is a greater vertical spacing between the guide ring 11a' and the valve receiving pocket 102a' (not shown). When installing the valve 54', an extension bar 83 is inserted between the main tool 52 and the knuckle point 117. The extension bar 83 is just long enough so that when the main tool 52 enters the inclined bore 12a, the lower end of the housing of the knuckle joint 117 is just below the upper end of the valve pocket 102. The length of the extension bar 83 is equal to the difference between the distance from the pocket 102 to the guide ring 11a, and the distance from the pocket 102a' to the guide ring 11a'.

As seen in Figs. 22 and 23, when the main tool 52 enters the bore 12a, the valve 54' is already beyond the pocket 102 and the tool 52 therefore cannot assume the inclined position shown in Fig. 16. The shoe members 58 are therefore pressed inwardly and the tool 52 passes through the guide ring 11a. When the main tool 52 reaches the guide ring 11a', it will assume a position coaxial with the bore 12a', and the valve 54' will be swung into alignment with the pocket 12a'.

It is obvious that several of the members 10a may be used, it merely being necessary that each lower member 10a be provided with an additional space between its valve receiving pocket and its guide ring, said additional space being equal to the length of the extension bar 83. Any of the individual valves may then be selectively installed or removed by inserting the proper number of extension bars 83 between the main tool 52 and the knuckle joint 117.

While I have shown and described the preferred forms of my invention, it is obvious that various changes may be made in their construction by those skilled in the art, without departing from the spirit of the invention as defined in the appended claims.

Having thus described my invention, what I claim and desire to secure by Letters Patent is:

1. A section of tubing for making up a tube in an oil well or the like comprising a length of tubing slotted part way along one side, another section of slotted tubing fixed thereto to provide an offset chamber along the tubing section communicating therewith, an arcuate wall member extending up from the bottom of said offset chamber and cooperating with the outer wall thereof to define a tubular valve receiving pocket, means closing the opposite ends of said offset chamber, and means for guiding members into said valve receiving pocket comprising a ring fixed in said tubing section at the top of the offset chamber, said ring comprising a cylindrical bore, the axis of which is inclined from the axis of the tubing section, the axis of said bore when projected intersecting the axis of said tubular valve receiving pocket above the upper end of said arcuate wall member.

2. A section of tubing or sub for making up the tube string in an oil well or the like comprising a length of tubing of a predetermined diameter at its opposite ends, the portion of said tubing between said ends being of a somewhat larger diameter, means extending along the side of the enlarged portion of said tubing forming a chamber laterally offset from the axis of said tubing, an arcuate wall member extending upwardly from the bottom of said offset chamber part way to the top thereof and cooperating with the outer wall thereof to define a tubular valve receiving pocket, and means for guiding valves and the like into said valve receiving pocket comprising a ring fixed in the tubing above the said valve receiving pocket but within the enlarged diameter portion of the tubing, said ring having a cylindrical bore therethrough, the axis of which is inclined from the axis of the tubing section, the axis of said bore when projected intersecting the axis of said tubular valve receiving pocket above the upper end of said arcuate wall member, said bore being of about the same size as the said end portions of said tubing.

3. A section of tubing adapted for being connected with other pieces of tubing for making up a tubing string inside the casing of an oil well or the like having its end portions formed to a predetermined diameter and its central portion between said end portions formed to a slightly larger diameter, a slot extending lengthwise along the section of tubing in the enlarged diameter portion thereof, means fixed to the tubing along the edges of said slot forming a chamber offset laterally from the axis of the section of tubing and extending upwardly from the bottom of said slot to form a tubular valve receiving pocket, and means for guiding valves and like members into said valve receiving pocket comprising a ring fixed in said tubing section at the upper end of said slot and having a cylindrical bore, the axis of which is inclined from the axis of said tubing section, the axis of said bore when projected intersecting the axis of said tubular valve receiving pocket above the upper end thereof.

4. In a gas lift system for an oil well or the like; a tubing string extending into the well, means mounted on the side of said tubing forming axially extending offset chambers therealong, slot means formed in the side wall of said tubing at the upper end of said offset chamber means to provide access thereto from internally of said tubing, and means for running and pulling valves and like members into and out of said offset chamber means comprising a cylindrical tool member, and a guide ring means fixed in said tubing at the top of said slot means having a bore therethrough inclined at an angle toward said slot means adapted for cooperation with said cylindrical tool member carried by a wire line so that valves and the like fixed to said tool member will be directed into said osffet chamber means.

5. In a gas lift system for an oil well or the like; a tubing string extending into the well, a plurality of members fixed to the outside of said tubing string at spaced points therealong forming axially extending chambers offset from the axis of said tubing string, said tubing being formed with slots in the side wall thereof adjacent the top of each offset chamber for providing access thereto so that valves and like devices can be introduced into and pulled from the said offset chambers, and means for guiding said devices into said chambers comprising a ring fixed in the tubing at the top of each slot, each ring having a bore therethrough inclined toward its pertaining slot adapted for cooperation with a cylindrical tool member, and the bottom of each slot being a different distance from its pertaining guide ring than the bottom of every other slot is from its guide ring.

6. In a gas lift system for an oil well or the like; a tubing string extending into the well, means mounted on the side of said tubing string at spaced points therealong forming axially extending chamber means along the tubing string offset laterally from the axis thereof, said tubing being formed with slot means in the side thereof extending from the top of each offset chamber part way downwardly therealong to provide access into the chambers for valves and like members which are to be seated in the bottom portion thereof, a guide ring in the tubing at the top of each said slot each comprising a cylindrical bore inclined at an angle toward the pertaining said slot for cooperation with a cylindrical tool member, and each said slot along the tubing string being longer than the slot in the string thereabove.

7. In a gas lift system for an oil well or the like; a tubing string extending into the well, means fixed to the side of said tubing forming a chamber extending axially therealong and offset laterally from the axis of the tubing, a slot formed in the side wall of the tubing extending from the top of said offset chamber part way therealong to provide access from the chamber to the inside of the tubing, a ring fixed in the tubing in the upper end of said slot having a cylindrical bore therethrough inclined toward the slot, and a tool member adapted for cooperation with said guide ring comprising a body portion smaller in diameter than the bore in said guide ring and carrying shoes spring urged outwardly for engagement with said guide ring whereby said tool member in passing through the guide ring will normally assume a position coaxial with said bore but can yield angularly relative thereto.

8. In a gas lift system for an oil well or the like; a tubing string extending into the well, means fixed to the side of said tubing and spaced therealong forming axially extending chamber means laterally offset from the axis of the tubing, a slot formed in the side of said tubing along the upper portion of each said offset chamber, a guide ring fixed in the tubing at the top of each said slot, each ring having a cylindrical bore therethrough inclined toward the pertaining slot, and a tool member adapted for fixedly suporting valve and like devices for insertion or removal from said offset chambers, said tool member comprising a body smaller in diameter than the bores in said guide rings and having shoes carried thereby spring pressed outwardly to engage said guide rings so that a tool member in passing through the guide rings will normally assume a position coaxial with the said bores therein but whereby when the device carried by the tool member strikes the tubing wall the said shoes will yield inwardly and permit the tool member to pass through the guide rings at an angle to the axis thereof.

9. In combination with a well tubing, chamber means formed in the tubing offset from the axis thereof and distributed along the tubing, there being a wall member extending upwardly from the bottom of each said chamber means part way therealong to form a valve receiving pocket, a valve seat in the valve receiving pocket for receiving a valve, and means for inserting and removing valves from said valve receiving pocket comprising a main tool adapted to be connected to a wire line and having means adapted to be connected to a valve, said main tool having an elongated body not greater in diameter than said tubing and having axially extending outwardly spring pressed shoes carried thereby, and a guide ring in the tubing at the upper end of each said offset chamber having a cylindrical bore therethrough inclined toward the pertaining said chamber, said bore being of a size that the main tool will normally tilt to a position coaxial with said bore in passing therethrough but the said shoes will yield and permit the main tool to pass through the bore at an angle to the axis thereof.

10. In combination with a well tubing having a laterally offset chamber extending axially therealong, a wall member extending upwardly between the chamber and tubing from the bottom of the chamber part way therealong forming a valve receiving pocket, a valve seat in said valve receiving pocket for receiving a valve, a ring fixed in the tubing immediately above said offset portion having a cylindrical bore therethrough inclined toward said offset chamber, a main tool member adapted to be suspended from a wire line and having means at the lower end adapted to fixedly support valves and like devices to be placed in said valve receiving pocket, said main tool comprising a main body member of a diameter to pass through said guide ring without any substantial tilting of the main tool relative to the tubing axis, longitudinally extending shoes carried by said body, and springs on said main tool pressing said shoes outwardly with sufficient thrust to engage said guide ring and tilt said main tool and the valves and the like fixedly supported on the lower end thereof until the valves and the like carried by the main tool either enter the pertaining offset chamber or strike said wall member.

11. In combination with a well tubing having a laterally offset chamber therein communicating with the tubing at the top of the chamber, a guide ring fixed in the tubing above the chamber having a bore therethrough inclined toward the chamber, a main tool adapted to be suspended from a wire line and having an elongated body member of a diameter that will pass through said guide ring without any substantial tilting relative to the axis of the tubing, shoes carried by said body member, springs on said tool pressing said shoes outwardly whereby resiliently to engage said guide ring and cause said main tool normally to move toward said chamber in passing through said guide ring, and means carried by the lower end of said main tool for fixedly supporting valves and valve engaging tools thereon.

12. In combination with a well tubing, said tubing having a plurality of offset chambers therein distributed therealong and each chamber comprising an upper opening communicating with the tubing and a lower part adapted for receiving a valve or like device, and means for selectively introducing said valves or like devices into said valve chambers comprising a ring in the tubing immediately above each said chamber having a bore therethrough inclined toward the pertaining chamber, and tool means adapted for resiliently engaging said guide rings whereby valve or like devices carried by said tool means will either enter the chamber pertaining to a guide ring or strike the side of the tubing below said opening in the top of the chamber and cause said tool means to pass on by the chamber.

13. In combination; a guide ring adapted for being fixed in a well tubing and having a bore therethrough inclined at an angle to the principal axis of the guide ring, and a tool adapted for cooperation with said ring, said tool comprising a body part smaller in diameter than the said bore in the ring, longitudinally extending guide shoes carried by the body, springs on said body pressing said shoes outwardly, said guide shoes being adapted for engaging said bore so as normally to cause said tool to tilt to the same angle as said bore in passing therethrough.

14. In combination; a ring having a bore therethrough adapted for being fixed in a tube with the bore at an angle to the axis of the tube, a tool having an elongated body adapted for forming a part of a tool string, said body being substantially smaller in diameter than said bore, shoe means carried by said body, springs on said body pressing said shoe means outwardly so as to engage the walls of said bore whereby said tool means in passing through said ring will normally tilt to the same angle as the axis of said bore but is capable of tilting in the bore so as to pass through said ring substantially on the axis of said tube.

15. In combination with a guide ring of the nature referred to having an inclined bore therethrough, a main tool adapted for resiliently engaging said bore so as to pass therethrough either on the axis of said bore or at an angle thereto, and a valve running tool carried by said main tool comprising means for releasably engaging a valve while holding the valve substantially rigid and coaxial with said main tool.

16. In combination with a guide ring of the nature referred to having an inclined bore therethrough, a main tool adapted for resiliently engaging said bore so as to pass therethrough either on the axis of said bore or at an angle thereto, and a pulling tool carried by said main tool having means for positively engaging a valve to be pulled from the tubing while holding the said valve substantially rigid and coaxial with said main tool.

17. In combination; a well tubing having an offset chamber on the side thereof, means forming a slot in the inside of the tubing above the chamber on the side thereof toward the chamber, a ring fixed in the tubing above the top of the chamber having a bore inclined toward said slot, and a tool string adapted for cooperation with said ring for running and pulling valves and like devices to and from said chamber comprising a cable, a main tool connected with said cable, means on said main tool adapted for resiliently engaging the walls of the bore in the ring so as to urge said main tool to be tilted thereby towards said slot, and means for supporting a valve or a pulling tool therefor on the bottom of said main tool so that the bottom of said valve or pulling tool will either enter said slot or will strike the wall of said tubing below the bottom of said slot.

18. In combination: a well tubing having an offset chamber on the side thereof, means forming a slot in the inside of the tubing above the chamber on the side thereof toward the chamber, a ring fixed in the tubing above the top of the chamber having a bore inclined toward said slot, and a tool string adapted for cooperation with said ring for running and pulling valves and like devices to and from said chamber comprising a cable, a main tool connected with said cable, means on said main tool adapted for resiliently engaging the walls of the bore in the ring so as to urge said main tool to be tilted thereby towards said slot, and means for supporting a valve or a pulling tool therefor on the bottom of said main tool so that the bottom of said valve or pulling tool will either enter said slot or will strike the wall of said tubing below the bottom of said slot, said tool string comprising a weight bar and knuckle joint means between the cable and the main tool.

19. In combination; a well tubing having an offset chamber on the side thereof, means forming a slot in the inside of the tubing above the chamber on the side thereof toward the chamber, a ring fixed in the tubing above the top of the chamber having a bore inclined toward the slot, and a tool string adapted for cooperation with said ring for running and pulling valves and like devices to and from said chamber comprising a cable, a main tool connected with said cable, means on said main tool adapted for resiliently engaging the walls of the bore in the ring so as to urge said main tool to be tilted thereby towards said slot, and means for supporting a valve or a pulling tool therefor on the bottom of said main tool so that the bottom of said valve or pulling tool will either enter said slot or will strike the wall of said tubing below the bottom of said slot, said tool string comprising a weight bar, a jar, and knuckle joint means between said cable and main tool.

20. A tube section or sub for a well having a laterally offset portion between the top and bottom ends thereof, an arcuate wall member extending upwardly from the lower end of said offset portion and having an upper end spaced below the upper end of said offset portion and cooperating with the outer wall thereof to define a tubular valve receiving pocket having an open top, and means for guiding valve installing or withdrawing tools into said valve receiving pocket comprising a guide member fixed within said tube section above the upper end of said offset portion, a bore in said guide member, the axis of said bore being inclined with respect to the axis of the main bore through said tube section, the axis of the bore in said guide member intersecting the axis of said tubular valve receiving pocket above the upper end of said arcuate wall member.

21. For use in a well tubing, a cylindrical section or sub of larger diameter than the remainder of said tubing, a pair of reducing nipples connected between said larger diameter sub and the rest of the tubing one at each end of said sub, a longitudinally extending groove milled in the inner surface of said sub adjacent the lower end thereof, a tubular valve receiving pocket closed at its lower end and fixed in said groove, and means fixed in said sub above and spaced from the upper end of said pocket for guiding valve installing or withdrawing tools into said pocket.

22. For use in a well tubing, a cylindrical section or sub of larger diameter than the remainder of said tubing, a pair of reducing nipples connected between said larger diameter sub and the rest of the tubing one at each end of said sub, a longitudinally extending groove milled in the inner surface of said sub adjacent the lower end thereof, a tubular valve receiving pocket closed at its lower end and fixed in said groove, and means for guiding valve installing or withdrawing tools into said pocket comprising a guide member having an inclined bore therethrough, said guide member being fixed in said sub above and spaced from the upper end of said pocket with the axis of said inclined bore intersecting the axis of said pocket above said pocket.

23. For use in a well tubing, a cylindrical section or sub of larger diameter than the remainder of said tubing, a pair of reducing nipples connected between said larger diameter sub and the rest of the tubing one at each end of said sub, a longitudinally extending groove milled in the inner surface of said sub adjacent the lower end thereof, a tubular valve receiving pocket closed at its lower end and fixed in said groove, a port extending through the wall of said sub and the wall of said pocket intermediate the ends thereof to provide communication between said pocket and the exterior of said sub, and means for guiding valve installing or withdrawing tools into said pocket comprising a guide member having an inclined bore therethrough, said guide member being fixed in said sub above and spaced from the upper end of said pocket with the axis of said inclined bore intersecting the axis of said pocket above said pocket.

24. For use in a well tubing, a cylindrical section or sub of larger diameter than the remainder of said tubing, a pair of reducing nipples connected between said larger diameter sub and the rest of the tubing one at each end of said sub, a longitudinally extending groove milled in the inner surface of said sub adjacent the lower end thereof, a tubular valve receiving pocket closed at its lower end and fixed in said groove, a port extending through the wall of said sub and the wall of said pocket intermediate the ends thereof to provide communication between said pocket and the exterior of said sub, a plurality of ports in the lower end of said pocket providing communication between the interior of said pocket and the interior of said sub, and means for guiding valve installing or withdrawing tools into said pocket comprising a guide member having an inclined bore therethrough, said guide member being fixed in said sub above and spaced from the upper end of said pocket with the axis of said inclined bore intersecting the axis of said pocket above said pocket.

25. In a gas lift system for an oil well or the like, a tubing string extending into the well, a sub in said tubing string of larger diameter than the remainder of said string, a pair of reducing nipples connected one between each of the opposite ends of said larger diameter sub and said tubing, a tubular longitudinally extending valve receiving pocket fixed to the inner wall of said sub with its axis offset from the axis of said sub, a ring fixed in said sub above said pocket, a cylindrical bore through said ring, the axis of said bore being inclined to the axis of said sub and intersecting the axis of said pocket above said pocket, and means adapted to cooperate with said inclined bore for installing and removing a valve from said pocket.

26. In a gas lift system for an oil well or the like, a tubing string extending into the well, a sub in said tubing string of larger diameter than the remainder of said string, a pair of reducing nipples connected one between each of the opposite ends of said larger diameter sub and said tubing, a tubular longitudinally extending valve receiving pocket fixed to the inner wall of said sub with its axis offset from the axis of said sub, a ring fixed in said sub above said pocket, a cylindrical bore through said ring, the axis of said bore being inclined to the axis of said sub and intersecting the axis of said pocket above said pocket, means adapted to cooperate with said inclined bore for installing and removing a valve from said pocket, said means comprising a centralizing tool connected to the lower end of a wire line, said centralizing tool being adapted to align itself with the axis of said inclined bore, and an installing or removing tool connected to the lower end of said centralizing tool, whereby when said centralizing tool is in said inclined bore and aligned therewith said installing or removing tool will be immediately above said valve pocket.

27. In a gas lift system for an oil well or the like, a tubing string extending into the well, a sub in said tubing string of larger diameter than the remainder of said string, a pair of reducing nipples connected one between each of the opposite ends of said larger diameter sub and said tubing, a tubular longitudinally extending valve receiving pocket fixed to the inner wall of said sub with its axis offset from the axis of said sub, a ring fixed in said sub above said pocket, a cylindrical bore through said ring, the axis of said bore being inclined to the axis of said sub and intersecting the axis of said pocket above said pocket, means adapted to cooperate with said inclined bore for installing and removing a valve from said pocket, said means comprising a jar connected to the lower end of a wire line, a centralizing tool connected to said jar by a knuckle joint, said centralizing tool being adapted to align itself with the axis of said inclined bore, and an installing or removing tool connected to the lower end of said centralizing tool by a second knuckle joint, whereby when said centralizing tool is in said inclined bore and aligned therewith said installing tool will be coaxial with and immediately above said valve pocket.

28. For use in a gas lift system, a tubular member adapted to be inserted in a well tubing, a tubular valve receiving pocket closed at its lower end, said tubular pocket being mounted on the inner wall of said tubular member and extending longitudinally adjacent the lower end thereof, and means for guiding valve installing or withdrawing tools into said pocket comprising a guide member having an inclined bore therethrough, said guide member being fixed in said tubular member above and spaced from the upper end of said pocket with the axis of said inclined bore intersecting the axis of said pocket above said pocket.

29. In a gas lift system for an oil well or the like, a tubular sub adapted to be inserted in a well tubing, a tubular longitudinally extending valve receiving pocket fixed to the inner wall of said tubular sub with the axis of said pocket offset from the axis of said sub, and a ring fixed in said sub above said pocket, said ring having formed therethrough a cylindrical bore, the axis of said bore being inclined to the axis of said sub and intersecting the axis of said pocket above said pocket.

References Cited in the file of this patent

UNITED STATES PATENTS

| | | |
|---|---|---|
| 2,230,107 | Garrett | Jan. 28, 1941 |
| 2,255,648 | Bryan | Sept. 9, 1941 |
| 2,297,044 | Barker | Sept. 29, 1942 |
| 2,394,977 | Boynton | Feb. 19, 1946 |
| 2,606,616 | Otis | Aug. 12, 1952 |
| 2,664,162 | Howard | Dec. 29, 1953 |
| 2,679,903 | McGowen | June 1, 1954 |
| 2,679,904 | Howard | June 1, 1954 |